United States Patent
Park et al.

(10) Patent No.: US 8,896,499 B2
(45) Date of Patent: Nov. 25, 2014

(54) STEREOSCOPIC IMAGE DISPLAY

(75) Inventors: Juseong Park, Goyang-si (KR);
Seungho Baek, Paju-si (KR); Jeongki Kim, Paju-si (KR); Jooeh Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 145 days.

(21) Appl. No.: 13/566,627

(22) Filed: Aug. 3, 2012

(65) Prior Publication Data
US 2013/0033480 A1 Feb. 7, 2013

(30) Foreign Application Priority Data

Aug. 4, 2011 (KR) .................. 10-2011-0077650

(51) Int. Cl.
G09G 5/00 (2006.01)
G09G 3/36 (2006.01)
G02B 27/22 (2006.01)
G02B 27/26 (2006.01)
H04N 13/04 (2006.01)
G09G 3/00 (2006.01)

(52) U.S. Cl.
CPC ............ *G02B 27/2214* (2013.01); *G02B 27/26* (2013.01); *H04N 13/0434* (2013.01); *G09G 3/3648* (2013.01); *G09G 3/003* (2013.01); *G09G 2300/0465* (2013.01); *G09G 2340/0457* (2013.01)

USPC .............. 345/6; 345/204; 345/210; 345/212; 345/87

(58) Field of Classification Search
CPC ..... G09G 3/36; G09G 3/3648; G09G 3/3659; G09G 3/003; G09G 2300/0465; G09G 2340/0457; G09G 3/3674; G09G 3/3696; H04N 13/0434
USPC ............. 345/6, 87–100, 204–214; 348/51–58
See application file for complete search history.

(56) References Cited

U.S. PATENT DOCUMENTS

| 2007/0171168 A1* | 7/2007 | Park et al. ........................ 345/92 |
| 2010/0289884 A1* | 11/2010 | Kang ............................... 348/58 |
| 2011/0025721 A1* | 2/2011 | Lee et al. ....................... 345/690 |
| 2011/0227886 A1* | 9/2011 | Lee et al. ....................... 345/204 |
| 2012/0140052 A1* | 6/2012 | Baek et al. ....................... 348/58 |
| 2012/0262430 A1* | 10/2012 | Ho et al. ......................... 345/204 |

\* cited by examiner

*Primary Examiner* — Hong Zhou
(74) *Attorney, Agent, or Firm* — Brinks Gilson & Lione

(57) ABSTRACT

A a stereoscopic image display includes: a liquid crystal display panel including a 3D control line to which a 3D control voltage is applied, and a plurality of pixels, each of the pixels being divided into a main pixel portion and an active black stripe; and a 3D control voltage generation circuit that supplies a 3D control voltage to the 3D control line and discharges a voltage of the active black stripe down to a black gray voltage.

11 Claims, 11 Drawing Sheets

STEREOSCOPIC IMAGE DISPLAY

This application claims the benefit of Korean Patent Application No. 10-2011-0077650 filed on Aug. 4, 2011, the entire contents of which is incorporated herein by reference for all purposes as if fully set forth herein.

BACKGROUND

1. Field

This document relates to a stereoscopic image display.

2. Related Art

Glass type stereoscopic image displays are divided into a polarization glasses type and a shutter glasses type. The polarization glasses type requires a polarization separation device, such as a patterned retarder, to be bonded to a display panel. The patterned retarder separates the polarizations of a left-eye image and a right-eye image displayed on the display panel. A viewer wears polarization glasses when viewing a stereoscopic image on the polarization glasses type stereoscopic image display to see the polarization of the left-eye image through a left-eye filter of the polarization glasses and the polarization of the right-eye image through a right-eye filter of the polarization glasses, thereby giving a stereoscopic feeling.

The display panel of the conventional polarization glasses type stereoscopic image display may be a liquid crystal display panel. A parallax is generated between a pixel array of the liquid crystal display panel and the patterned retarder due to the thickness of an upper glass substrate of the liquid crystal display panel and the thickness of an upper polarization substrate, and this leads to a poor vertical viewing angle. When the viewer views a stereoscopic image displayed on the polarization glasses type stereoscopic image display at a vertical viewing angle higher or lower than the front surface of the liquid crystal display panel, they may feel a 3D crosstalk where the left eye image and the right eye image overlap each other when viewing them with a single eye (left eye or right eye).

In order to solve the problem of 3D crosstalk at vertical viewing angle in the polarization glasses type stereoscopic image display, Japanese Laid Open Publication NO. 2002-185983 proposed a method for forming black stripes on a patterned retarder (or 3D film) of a stereoscopic image display. In a method different from this method, the width of black matrices formed on a liquid crystal display panel can be increased. However, the formation of black stripes on the patterned retarder may result in a reduction in luminance of 2D/3D images, and the black matrices may interact with the black stripes, thereby generating moiré. Also, an increase in the width of black matrices may reduce aperture ratio, thereby degrading luminance of 2D/3D images.

The present applicant proposed the technique of dividing each of pixels of a display panel into two parts and using one of the two parts by an active black stripe in U.S. patent application Ser. No. 12/536,031 (Aug. 5, 2009). The stereoscopic image display proposed by the present applicant can provide more excellent display quality than the existing stereoscopic image display, by offering the advantages of preventing a reduction in luminance of a 2D image by dividing each of the pixels into the two parts and writing 2D image data to each of the divided pixels in a 2D mode, and improving the visibility of both the 2D and 3D images by widening a vertical viewing angle in a 3D image. The active black stripe may include a thin film transistor (hereinafter, "TFT") and a liquid crystal cell.

The active black stripe technology proposed by the present applicant requires discharging of the voltage of a liquid crystal cell to a black gray voltage. To this end, a relatively high voltage may be applied to a gate of the TFT included in the active black stripe so that on current flows in the TFT during a predetermined period of time. In this case, the TFT of the active black stripe may undergo degradation in driving characteristics, including a threshold voltage shift caused by a gate bias stress. To increase the completeness of the active black stripe technology in the 3D mode, it is necessary to guarantee enough discharging time of active black stripes across the entire screen so that the active black stripes on the entire screen can represent a black gray scale.

SUMMARY

A stereoscopic image display includes: a liquid crystal display panel including data lines, gate lines crossing the data lines, a common electrode to which a common voltage is applied, a 3D control line to which a 3D control voltage is applied, and a plurality of pixels, each of the pixels being divided into a main pixel portion and an active black stripe; a data driving circuit that supplies a data voltage of a 2D image to the data lines in 2D mode, and supplies a data voltage of a 3D image to the data lines in 3D mode; a gate driving circuit that sequentially supplies gate pulses swinging between a gate low voltage and a gate high voltage to the gate lines in the 2D mode and the 3D mode; and a 3D control voltage generation circuit that supplies the 3D control voltage to the 3D control line and discharges a voltage of the active black stripe down to a black gray voltage.

The 3D control voltage generation circuit supplies an alternating voltage swinging between the 3D control voltage and the gate low voltage to the 3D control line in the 3D mode.

According to another embodiment of the present invention, there is provided a stereoscopic image display including: a liquid crystal display panel including data lines, gate lines crossing the data lines, a common electrode to which a common voltage is applied, a 3D control line to which a 3D control voltage is applied, and a plurality of pixels, each of the pixels being divided into a main pixel portion and an active black stripe; a data driving circuit that supplies a data voltage of a 2D image to the data lines in 2D mode, and supplies a data voltage of a 3D image to the data lines in 3D mode; a gate driving circuit that sequentially supplies gate pulses swinging between a gate low voltage and a gate high voltage to the gate lines in the 2D mode and the 3D mode; and a 3D control voltage generation circuit that supplies the 3D control voltage to the 3D control line and discharges a voltage of the active black stripe down to a black gray voltage.

According to another embodiment of the present invention, there is provided a stereoscopic image display including: a liquid crystal display panel including data lines, gate lines crossing the data lines, a common electrode to which a common voltage is applied, 3D control lines which are divided into two or more parts, and to which a 3D control voltage is applied, and a plurality of pixels, each of the pixels being divided into a main pixel portion and an active black stripe; a data driving circuit that supplies a data voltage of a 2D image to the data lines in 2D mode, and supplies a data voltage of a 3D image to the data lines in 3D mode; a gate driving circuit that sequentially supplies gate pulses swinging between a gate low voltage and a gate high voltage to the gate lines in the 2D mode and the 3D mode; and a 3D control voltage generation circuit that supplies the 3D control voltage to the 3D control lines at time intervals and discharges a voltage of the active black stripe down to a black gray voltage.

The 3D control voltage generation circuit supplies an alternating voltage swinging between the 3D control voltage and the gate low voltage to the divided 3D control lines in the 3D mode.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION

Figure 1:
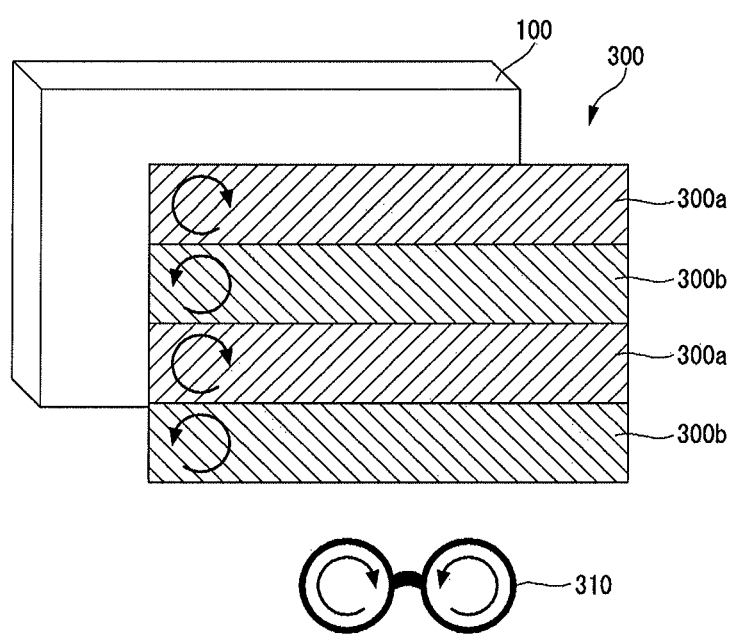
FIG. 1 is a block diagram illustrating a configuration of a multimedia message service system to which this document is applied.
Figure 2:
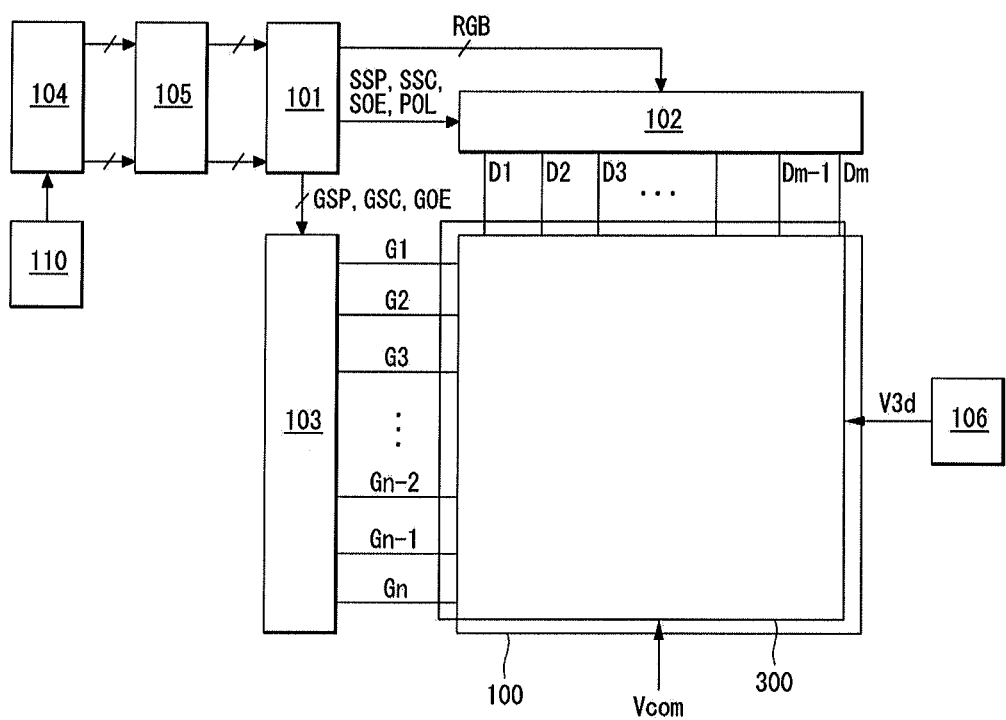
FIG. 2 is a block diagram showing driving circuits of a stereoscopic image display shown in FIG. 1.

Hereinafter, exemplary embodiments of the present invention will be described in detail with reference to the attached drawings. Throughout the specification, the same reference numerals indicate substantially the same components. Further, in the following description, well-known functions or constructions related to the present invention will not be described in detail if it appears that they could obscure the invention in unnecessary detail.

The stereoscopic image display of the present invention may be implemented based on a liquid crystal display. The liquid crystal display may be implemented in any form including a transmissive liquid crystal display semi-transmissive liquid crystal display, and a reflective liquid crystal display. The transmissive liquid crystal display and the semi-transmissive liquid crystal display require a backlight unit which is omitted in the drawings. The backlight unit may be implemented as a direct type backlight unit or an edge type backlight unit.

Referring to FIGS. 1 through 4, the stereoscopic image display according to an exemplary embodiment of the present invention includes a liquid crystal display panel 100, a patterned retarder 300, and polarization glasses 310.

The liquid crystal display panel 100 displays a 2D image in 2D mode, and displays a 3D image in 3D mode. The liquid crystal display panel 100 includes a liquid crystal layer formed between two glass substrates. The liquid crystal display panel 100 includes pixels disposed in a matrix form according to a crossing structure of data lines DL and gate lines GL.

On a TFT array substrate of the liquid crystal display panel 100, data lines D1 to Dm, gate lines G1 to Gn, a 3D control line G3d, thin film transistors (hereinafter, "TFTs") T1 to T3, pixel electrodes PIX1 and PIX2, common electrodes COM1 and COM2, a common voltage supply line COM connected to the common electrodes COM1 and COM2, and a storage capacitor Cst1 and Cst2. A TFT supplies a data voltage form a data line DL to a pixel electrode PIX1 and PIX2 in response to a gate pulse from a gate line GL.

On a color filter array substrate of the liquid crystal display panel 100, black matrices, color filters, etc. are formed. An upper common electrode may be formed on the color filter array substrate.

Polarization plates (not shown) are respectively bonded to the TFT array substrate and color filter array substrate of the liquid crystal display panel 100. In the TFT array substrate and the color filter substrate, alignment layers for setting a pre-tilt angle of liquid crystals are respectively formed on the surfaces contacting the liquid crystals. A column spacer for keeping a cell gap of the liquid crystal layer may be formed between the TFT array substrate and the color filter substrate.

The liquid crystal display panel 100 is not limited to the above-described structure, but may be implemented as a vertical electric field driving type such as a TN (twisted nematic) mode and a VA (vertical alignment) mode, or as a horizontal electric field type such as an IPS (in plane switching) mode and an FFS (fringe field switching) mode. Further, it may be implemented in any well-known liquid crystal mode.

Each of pixels of the liquid crystal display panel 100 may include a liquid crystal cell, and may be divided into a red subpixel, a green subpixel, and a blue subpixel. The subpixels are not limited to the RGB subpixels. For example, the pixels may further include one or more of white, cyan, magenta, yellow subpixels.

Figure 3:
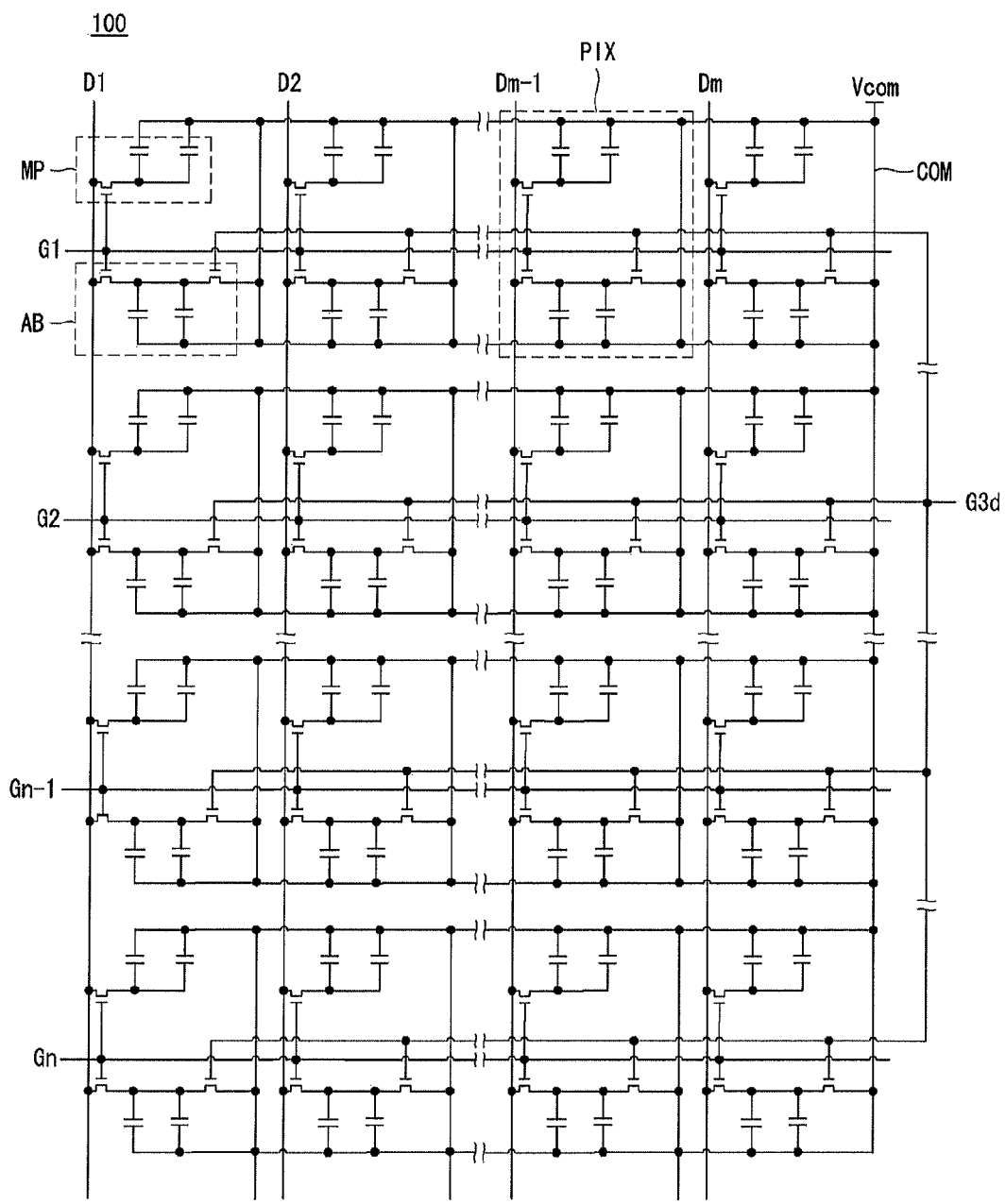
FIG. 3 is an equivalent diagram schematically showing a pixel array of a liquid crystal display panel shown in FIG. 1.
Figure 4:
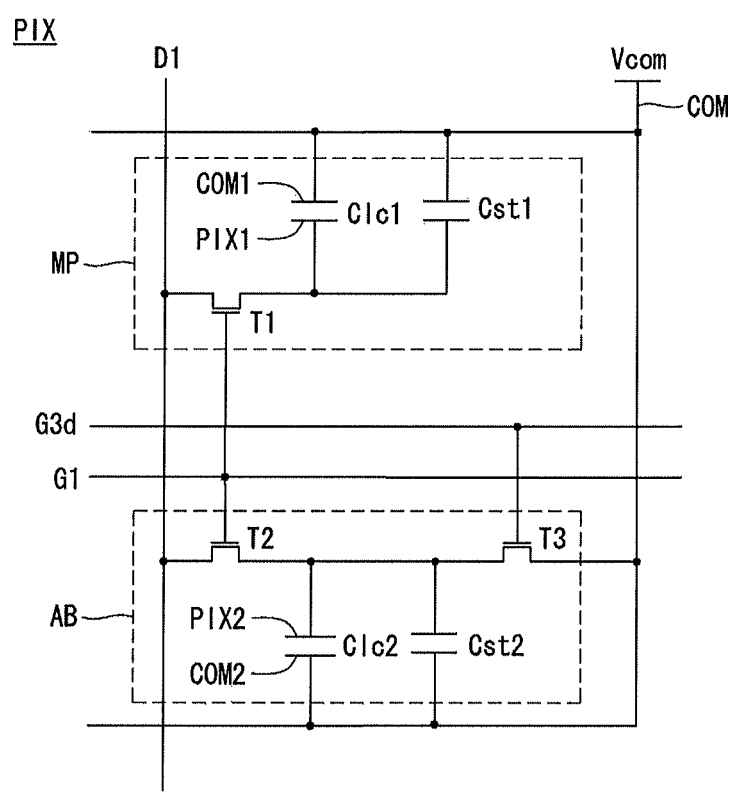
FIG. 4 is a circuit diagram enlargedly showing 1 subpixel of FIG. 3.

Each of the subpixels PIX includes a main pixel portion (MP of FIGS. 3 and 4) and an active black stripe (AB of FIGS. 3 and 4). The main pixel portion MP displays video data of a 2D image in the 2D mode, and displays video data of a 3D image in the 3D mode. In contrast, the active black stripe AB serves as a pixel for displaying video data of a 2D image in the 2D mode, and serves as a black stripe for displaying a black gray scale in the 3D mode. Accordingly, the active black stripe AB increases the aperture ratio and luminance of a 2D image in the 2D mode, and widens the vertical viewing angle of a 3D image in the 3D mode. The sizes and shapes of the main pixel portion MP and the active black stripe AB in one subpixel may be properly designed in the driving characteristics of the panel, the luminance of a display image, the viewing angle of a 3D image, the characteristics of applications, etc.

The patterned retarder 300 is bonded to an upper polarization plate of the liquid crystal display panel 100. The patterned retarder 300 includes a first phase delay pattern 300a facing odd-numbered lines in a pixel array and a second phase delay pattern 300b facing even-numbered lines in the pixel array. The optical axes of the first phase delay pattern 300a and the second phase delay pattern 300b are orthogonal to each other. The first phase delay pattern 300a and the second phase delay pattern 300b each may be implemented as a birefringent medium that delays the phase of incident light by ¼ wavelength. The pattern retarder 300 may be implemented as a glass patterned retarder GPR based on a glass substrate or a film patterned retarder FPR based on a film substrate.

On the display screen of the liquid crystal display panel 100, the odd-numbered lines may display a left-eye image, and the even-numbered lines may display a right-eye image. In this case, light of the right-eye image displayed in the odd-numbered lines of the pixel array passes as linearly polarized light through the upper polarization plate and enters the second phase delay pattern 300b. Linearly polarized light of the left-eye image and linearly polarized light of the right-eye image are phase-delayed by a phase difference of the first phase delay pattern of the patterned retarder 300, passes through the first phase delay pattern 300a, and is converted into left circularly polarized light. The linearly polarized light of the right-eye image is phase-delayed by a phase difference of the second phase delay pattern 300b, passes through the second phase delay pattern 300b, and is converted into right circularly polarized light.

A left-eye polarization filter of the polarization glasses allows only left circularly polarized light to pass therethrough, and a right-eye polarization filter thereof allows only right circularly polarized light to pass therethrough. Accordingly, when a viewer wears the polarization glasses 310 in the 3D mode, the viewer sees pixels displaying the left-eye image with the left eye and pixels displaying the right-eye image with the right eye, thereby having a stereoscopic feeling due to a binocular parallax.

The stereoscopic image display of the present invention includes a data driving circuit 102, a gate driving circuit 103, a 3D control voltage generation circuit 106, a data formatter 105, and a timing controller 101.

Each of source drive ICs (Integrated Circuits) of the data driving circuit 102 includes a shift register, a latch, a digital-to-analog converter DAC, and an output buffer. The source drive ICs latch digital video data RGB of 2D/3D images under the control of a timing controller 101. The source drive ICs convert the digital video data RGB into an analog positive polarity gamma compensation voltage and a negative polarity gamma compensation voltage to invert the polarity of a data voltage. The gamma compensation voltages are generated by a gamma voltage generation circuit (not shown) and supplied to the source drive ICs. The source drive ICs output positive/negative data voltages to the data lines D1 to Dm in response to a source output enable signal SOE. In the 2D mode, the source drive ICs output data voltages of a 2D image, which is not divided into a left-eye image and a right-eye image. In the 3D mode, of a right-eye image to the data lines D1 to Dm. The source drive ICs may be connected to the data lines DL of the liquid crystal display panel 100 by a COG (Chip On Glass) process or TAB (Tape Automated Bonding) process.

The gate driving circuit 103 includes a shift register, a level shifter, and the like. The gate driving circuit 103 sequentially supplies a gate pulse (or scan pulse) synchronized with a data voltage Vdata of a 2D image or 3D image to the gate lines G1 to Gn in the same method for the 2D mode and the 3D mode under the control of the timing controller 101. The gate pulse swings between a gate low voltage Vgl and a gate high voltage Vgh. The gate driving circuit 103 may be connected to the gate lines G1 to Gn of the liquid crystal display panel 100 through a TAB process, or directly formed on the TFT array substrate of the liquid crystal display panel 100 through a GIP (Gate In Panel) process.

The 3D control voltage generation circuit 106 supplies a DC voltage to the 3D control line G3d in the 2D mode under the control of the timing controller 101. The DC voltage may be a gate low voltage Vgl. In the 3D mode, the 3D control voltage generation circuit 106 supplies an alternating voltage swinging between a 3D control voltage Vso and a gate low voltage Vgl to the 3D control line G3d as shown in FIGS. 5, 8, 10, 12, and 14. In the case that the 3D control line of the liquid crystal display panel 100 is divided into two or more parts as shown in FIGS. 9, 11, and 13, the 3D control voltage generation circuit 106 supplies a 3D control voltage to the divided 3D control lines at time intervals.

The data formatter 105 receives 3D image data input from a host system 104, and separates left-eye image data and right-eye image data line by line and transmits them to the timing controller 101. In the 2D mode, the data formatter 105 transmits 2D image data input from the host system 104 as it is to the timing controller 101.

Upon receiving timing signals such as a vertical synchronization signal Vsync, a horizontal synchronization signal Hsync, a data enable signal DE, a dot clock CLK, and the like, from the host system 104, the timing controller 101 generates timing control signals for controlling an operation timing of the data driving circuit 102 and the gate driving circuit 103.

The timing control signals include a gate timing control signal for controlling an operation timing of the gate driving circuit 103 and a data timing control signal for controlling an operation timing of the data driving circuit 102 and the polarity of a data voltage. Upon receiving a mode signal Mode from the host system 104, he timing controller 101 may generate a mode switching signal 2D/3D for switching the operation state between the 2D and 3D modes.

The gate timing control signal includes a gate start pulse (GSP), a gate shift clock (GSC), a gate output enable signal (GOE), and the like. The gate start pulse (GSP) controls a start operation timing of the gate driving circuit 103. The gate shift clock (GSC) is a clock signal for shifting the gate start pulse (GSP). The gate output enable signal (GOE) controls an output timing of the gate driving circuit 103. The gate timing control signal is generated in the 2D mode and the 3D mode.

The data timing control signal includes a source start pulse SSP, a source sampling clock SSC, a polarity control signal POL, a source output enable signal SOE, and the like. The source start pulse SSP controls a data sampling start timing of the data driving circuit 102. The source sampling clock SSC is a clock signal for shifting the source start pulse SP, and controls a sampling timing of data. The polarity control signal POL controls a polarity inversion timing of a data voltage output from the data driving circuit 102. The source output enable signal SOE control the data voltage output timing and charge sharing timing of the data driving circuit 102. When digital video data to be inputted to the data driving circuit 102 is transmitted in the mini LVDS (Low Voltage Differential Signaling) interface standard, the source start pulse (SSP) and the source sampling clock (SSC) may be omitted.

The timing controller 101 may control operation timings of the driving circuits 102 and 103 by a frame frequency of (input frame frequency×i) Hz (I is a positive integer), which is obtained by multiplying an input frame frequency i times. The input frame frequency is 60 Hz in NTSC (National Television Standards Committee) mode and 50 Hz in PAL (Phase-Alternating Line) mode.

The host system 104 supplies 2D/3D image data and the timing signals Vsync, Hsync, DE, and CLK to the timing controller through an interface such as an LVDS (Low Voltage Differential Signaling) interface and a TMDS (Transition Minimized Differential Signaling) interface. The host system 104 supplies a mode signal Mode indicating the 2D mode or the 3D mode to the timing controller 101. The host system 104 supplies the 2D/3D image data and the timing signals to the timing controller 101 through the data formatter 105.

A user may select the 2D mode or the 3D mode using a user input device 110. The user input device 110 includes a touch screen, an on-screen display (OSD), a keyboard, a mouse, a remote controller, etc. that are attached to or mounted inside the display panel 100.

The host system 104 may switch between an operation of the 2D mode and an operation of the 3D mode in response to user data input through the user input device 110. The host system 104 may switch between the operation of the 2D mode and the operation of the 3D mode through a 2D or 3D identification code encoded to input image data, for example, a 2D or 3D identification code which can be coded in an EPG (electronic program guide) or an ESG (electronic service guide) of a digital broadcasting standard.

FIGS. 3 and 4 are equivalent circuit diagrams of the pixel array of the liquid crystal display panel 100.

Referring to FIGS. 3 and 4, the main pixel portion MP includes a first TFT T1, a first liquid crystal cell Clc1, and a first storage capacitor Cst1.

The first TFT T1 supplies a data voltage from the data line D1 to the first liquid crystal cell Clc1 and the first storage capacitor Cst1 in response to a gate pulse from the gate line G1. A gate electrode of the first TFT T1 is connected to the gate line G1. A drain electrode of the first TFT T1 is connected to the data line D1, and a source electrode thereof is connected to the pixel electrode PIX1 of the first liquid crystal cell Clc1 and a first electrode of the first storage capacitor Cst1.

In the 2D mode, the first liquid crystal cell Clc1 is charged with a data voltage of a 2D image supplied to the pixel electrode PIX1 through the first TFT T1 to display data of the 2D image. In the 3D mode, the first liquid crystal cell Clc1 is charged with a data voltage of a 3D image supplied to the pixel electrode PIX1 through the first TFT T1 to display data of the 3D image. Liquid crystals of the first liquid crystal cell Clc1 are driven by an electric field between the pixel electrode PIX1 to which a data voltage is applied and a common electrode COM1 to which a common voltage Vcom is applied to adjust optical transmissivity. The first storage capacitor Cst1 includes the first electrode to which a data voltage is applied, a second electrode to which the common voltage Vcom is applied, and a dielectric layer formed between the electrodes. The first storage capacitor Cst1 is connected to the first liquid crystal cell Clc.

The common voltage Vcom is supplied to the common electrode COM1 of the first liquid crystal cell Clc1 and the second electrode of the first storage capacitor Cst1 through a common voltage supply line COM.

The active black stripe AB includes second and third TFTs T2 and T3, a second liquid crystal cell Clc2, and a second storage capacitor Cst2.

The first and second TFTs T1 and T2 are simultaneously turned on/off by a gate pulse from the same gate line. The second TFT T2 is turned on simultaneously with the first TFT T1 in response to a gate pulse from the gate line G1, and supplies a data voltage from the data line D1 to the second liquid crystal cell Clc2 and the second storage capacitor Cst2. A gate electrode of the second TFT T2 is connected to the gate line G1 to which the gate electrode of the first TFT T1 is connected. A drain electrode of the second TFT T2 is connected to the data line D1 to which the drain electrode of the first TFT T1 is connected. A source electrode of the second TFT T2 is connected to the pixel electrode PIX2 of the second liquid crystal cell Clc2 and a first electrode of the second storage capacitor Cst2.

A drain-source current of the third TFT T3 is adjusted in accordance with the 3D control voltage Vso applied to the 3D control line G3d. The 3D control line G3d is commonly connected to two or more neighboring lines in the pixel array of the liquid crystal display panel 100, and simultaneously controls the active black stripes AB connected to these lines. While the third TFT T3 is kept in the off state in the 2D mode, it forms a discharge path between the second liquid crystal cell Clc2 and second storage capacitor Cst2 and the common voltage source Vcom in accordance with the 3D control voltage Vso from the 3D control line G3d and discharges the voltage of the second liquid crystal cell Clc2 and the second storage capacitor Cst2 down to a black gray voltage. The black gray voltage is a common voltage Vcom or a voltage similar thereto. The common voltage is a voltage ranging between 6V to 8V. A gate electrode of the third TFT T3 is connected to the 3D control line G3d. A drain electrode of the third TFT T3 is connected to the pixel electrode PIX2 of the second liquid crystal cell Clc2 and the first electrode of the second storage capacitor Cst2. A source electrode of the third TFT T3 is connected to the common electrode COM2 of the second liquid crystal cell Clc2 and a second electrode of the second storage capacitor Cst2.

In the 2D mode, the second liquid crystal cell Clc2 is charged with a data voltage of a 2D image supplied to the pixel electrode PIX2 through the second TFT T2 to display data of the 2D image. In the 3D mode, the second liquid crystal cell Clc2 is charged with a data voltage of a 3D image supplied to the pixel electrode PIX2 through the second TFT T2, and then immediately discharged, along with the second storage capacitor Cst2, down to the black gray voltage. Accordingly, the second liquid crystal cell Clc2 displays a black gray scale in the 3D mode. Liquid crystals of the second liquid crystal cell Clc2 are driven by an electric field between the pixel electrode PIX2 to which a data voltage is applied and a common electrode COM2 to which a common voltage Vcom is applied to adjust optical transmissivity. The second storage capacitor Cst2 includes the first electrode to which a data voltage is applied, the second electrode to which the common voltage Vcom is applied, and a dielectric layer formed between the electrodes. The first storage capacitor Cst1 is connected to the first liquid crystal cell Clc. The second storage capacitor Cst2 is connected to the second liquid crystal cell Clc2, and keeps the voltage of the second liquid crystal cell Clc2 constant in the 2D mode and is discharged, along with the second liquid crystal cell Clc2, down to the black gray voltage in the 3D mode.

Figure 5:
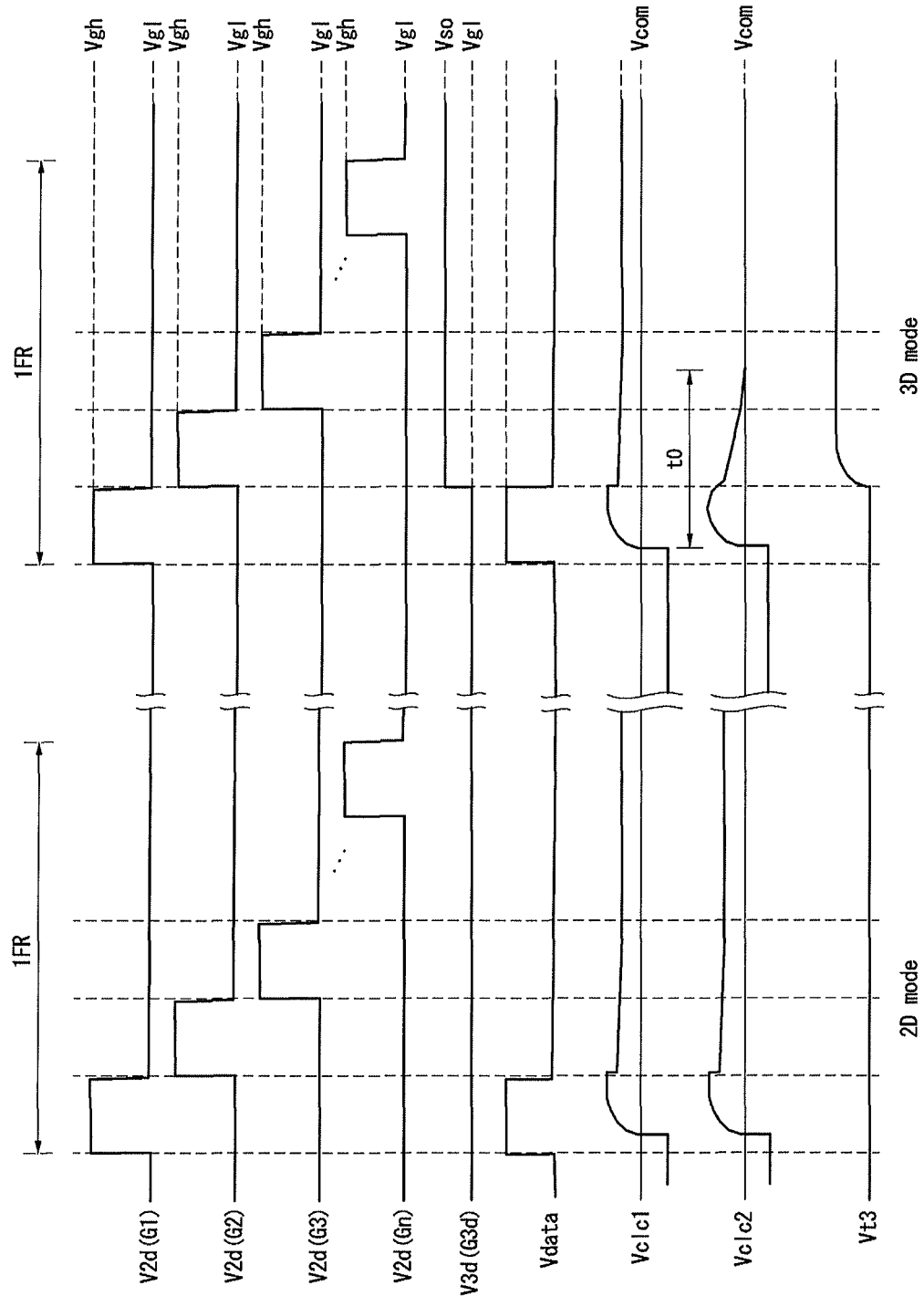
FIG. 5 is a waveform diagram showing gate pulses, a 3D control voltage, a data voltage, liquid crystal cell voltages, and a gate voltage of a third TFT.
Figure 6:
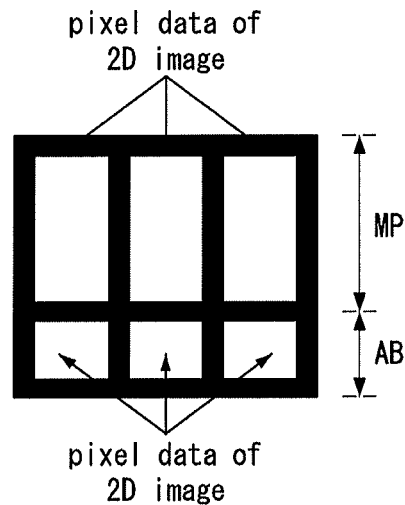
FIG. 6 is a view showing an operation of an active black stripe AB in the 2D mode.
Figure 7:
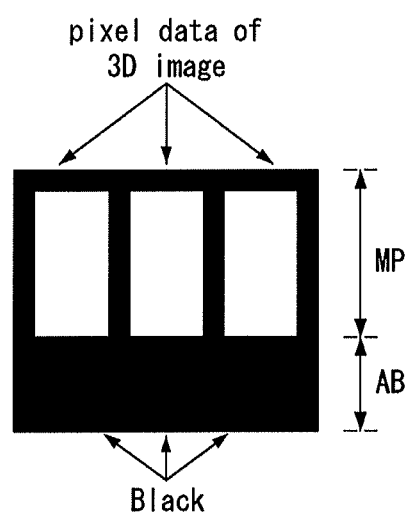
FIG. 7 is a view showing an operation of the active black stripe AB in the 3D mode.

FIG. 5 is a waveform diagram showing gate pulses V2d(G1) to Ved(Gn), a 3D control voltage Vso, a data voltage Vdata, liquid crystal cell voltages Vclc1 and Vclc2, and a gate voltage Vt3 of the third TFT T3. In FIG. 5, "1FR" denotes 1 frame period, and "V3d(G3d)" denotes a voltage of the 3D control line G3d. FIG. 6 is a view showing an operation of the active black stripe AB in the 2D mode. FIG. 7 is a view showing an operation of the active black stripe AB in the 3D mode.

Referring to FIGS. 5 through 7, in the 2D mode, gate pulses V2d(G1) to V2d(Gn) are sequentially supplied to the gate lines G1 to Gn. The gate pulses V2d(G1) to V2d(Gn) swing between a gate low voltage Vgl and a gate high voltage Vgh. The gate low voltage Vgl is a voltage ranging between 0V and 5V, which is lower than a threshold voltage of the TFTs T1 to T3. The pixels of the pixel array are sequentially selected line by line in the 2D mode and charged with a data voltage Vdata of a 2D image. A main pixel portion MP and an active black stripe AB that are included in the same subpixel PIX are simultaneously charged with the data voltage Vdata of the 2D image. In the 2D mode, the liquid crystal cells Clc1 and Clc2 of the main pixel portion MP and the active black stripe AB maintain the data voltage of the 2D image during 1 frame period by the storage capacitors Cst1 and Cst2.

In the 2D mode, a voltage of the 3D control line G3d maintains the gate low voltage Vgl. In the 2D mode, the third TFT T3 is kept in the off state. Accordingly, the main pixel portion MP and the active black stripe AB are operated substantially in the same manner in the 2D mode. That is, as shown in FIG. 6, they are simultaneously charged with the data voltage Vdata of the 2D image and maintains the data voltage Vdata during 1 frame period.

In the 3D mode, gate pulses V2d(G1) to V2d(Gn) are sequentially supplied to the gate lines G1 to Gn. The gate pulses V2d(G1) to V2d(Gn) swing between the gate low voltage Vgl and the gate high voltage Vgh. The pixels of the pixel array are sequentially selected line by line in the 3D mode and charged with a data voltage Vdata of a 3D image which is a left- or right-eye image. A main pixel portion MP and an active black stripe AB that are included in the same subpixel PIX are simultaneously charged with the data voltage Vdata of the 3D image. The 3D control voltage Vso is supplied to the 3D control line G3d since a particular point of time. The 3D control voltage Vso is higher than the threshold voltage of the third TFT T3. The 3D control voltage Vso may be set to a voltage which is higher than the common voltage Vcom and lower than the gate high voltage Vgh so that the on current of the third TFT T3 becomes smaller than those of the first and second TFTs T1 and T2. Accordingly, the third TFTs T3 of the active black stripes AB commonly connected to the 3D control line G3d are simultaneously turned on by the 3D control voltage Vso applied to their gate electrodes.

The voltage of the liquid crystal cells Clc2 and storage capacitor Cst2 of the active black stripes AB is discharged down to the black gray voltage because it is discharged by the common voltage source Vcom through the third TFTs T3. Accordingly, in the 3D mode, the main pixel portion MP is charged with the data voltage Vdata of the 3D image and maintains the data voltage Vdata during 1 frame period, and the active black stripe AB is discharged down to the black gray voltage through the third TFT T3, as shown in FIG. 7.

In the 3D mode, the 3D control voltage Vso is lower than the gate high voltage Vgh, and therefore the on current of the third TFT T3 is lower than the on current of the first and second TFTs T1 and T2. In the 3D mode, if the gate voltage of the third TFT T3 is as high as the gate high voltage Vgh, the on current of the third TFT T3 is increased to the same level as the second TFT T2. When the on current of the third TFT T3 is increased, the data voltage of the 3D image supplied to the data line D1 may be discharged down to the voltage of the liquid crystal cell Clc1 and the storage capacitor Cst1 through the second and third TFTs T2 and T3. Accordingly, in order to prevent distortion of the data voltage of the 3D image charged in the main pixel portion in the 3D mode, the on current of the third TFT T3 has to be set lower than the on current of the first and second TFTs T1 and T2.

Because the on current of the third TFT T3 is low in the 3D mode, it takes time t0 until the liquid crystal cell Clc2 of the active black stripe B is discharged down to the black gray voltage. Also, the voltage of the 3D control line G3d needs to be periodically swung in the 3D mode in order to compensate for a gate bias stress of the third TFT T3. To satisfy all of these conditions, the present invention drives the active black stripes AB in the same method as in FIGS. 3 to 14.

Figure 8:
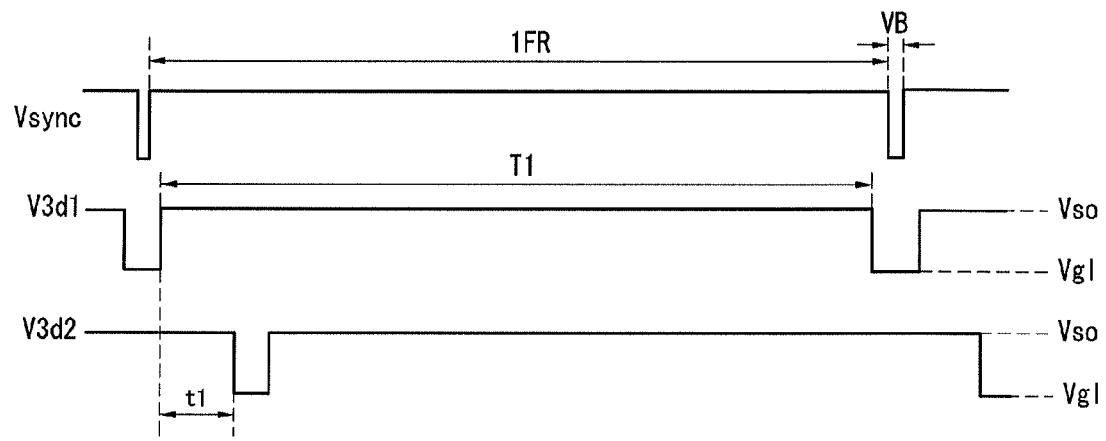
FIG. 8 is a waveform diagram showing a method for driving an active black stripe according to first and second exemplary embodiments of the present invention.
Figure 9:
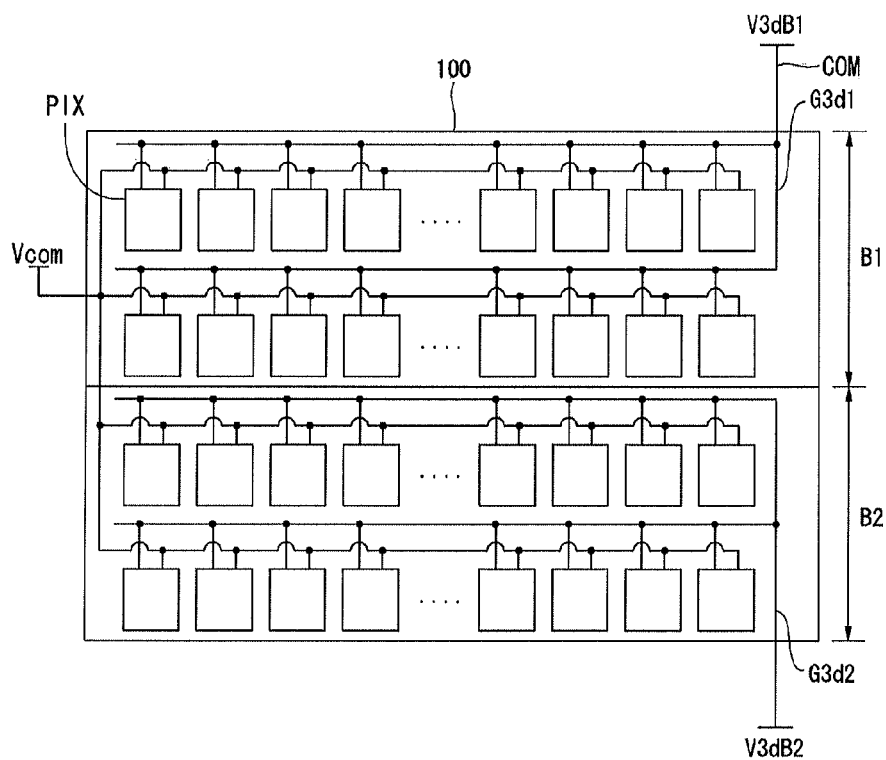
FIG. 9 is a view showing an example of two-division driving of the stereoscopic image display.

FIG. 8 is a waveform diagram showing a method for driving an active black stripe according to first and second exemplary embodiments of the present invention. The method for driving an active black stripe according to the first and second exemplary embodiments of the present invention may be applied to the stereoscopic image display in which the 3D control line G3d and the common voltage supply line COM are commonly connected to all the active black stripes AB in the liquid crystal display panel 100, as shown in FIG. 3. In FIG. 8, "V3d1" is a voltage supplied to the 3D control line G3d in the method for driving an active black stripe according to the first exemplary embodiment of the present invention. "V3d2" denotes a voltage supplied to the 3D control line G3d in the method for driving an active black stripe according to the second exemplary embodiment of the present invention.

Referring to FIG. 8, in the method for driving an active black stripe according to the first exemplary embodiment of the present invention, an alternating voltage V3d1 is supplied to the 3D control line G3d in the 3D mode. In the 3D mode, a gate low voltage Vgl is supplied to the 3D control line G3d during a vertical blank period VB with no data input or during a predetermined period of time including the vertical blank period, in order to compensate for a gate bias stress of the third TFT T3. Moreover, in the 3D mode, the 3D control voltage Vso is supplied to the 3D control line G3d during a period T1 between vertical blank periods AB so that the liquid crystal cell voltage of the active black stripes AB is discharged down to the black gray voltage. The period T1 between vertical blank periods VB is longer than the time t0 required for the active black stripes AB to reach the black gray level and shorter than 1 frame period 1FR.

In the method for driving an active black stripe according to the first exemplary embodiment of the present invention, the voltage V3d1 of the 3D control line G3d is lowered to the gate low voltage Vgl in a vertical blank period VB or around that period, and therefore the liquid crystal cells of the active black stripes AB included in pixels whose scan timing is late may not have the time t0 required for them to be lowered to the black gray voltage. In the case that, as shown in FIG. 5, gate pulses are sequentially supplied to the first gate line to the n-th gate line, the pixels whose scan timing is late may be pixels positioned at the bottom end of the liquid crystal display panel. When the voltage V3d1 of the 3D control line G3d is lowered to the gate low voltage Vgl in a vertical blank period VB or around that period, it is difficult for the active back stripes AB included in the pixels whose scan timing is late to be discharged down to the black gray voltage because the ON time of the third TFT T3 is short.

In the method for driving an active black stripe according to the second exemplary embodiment of the present invention, an alternating voltage V3d2 is supplied to the 3D control line G3d in order to ensure a sufficient discharge timing of all the active black stripes of the liquid crystal display panel 100. The 3D control voltage Vso is continuously supplied to the 3D control line G3d during time t1 from the current frame period (or N-th frame period) to the next frame period (or (N+1)-th frame period). The voltage V3d2 of the 3D control line G3d is maintained at the 3D control voltage Vso until the time t1 has elapsed from the start timing of the next frame period, and then lowered to the gate low voltage Vgl. The time t1 is longer than the time t0 required for the voltage of the liquid crystal cell Clc2 and storage capacitor Cst2 of the active black stripes to be discharged down to the black gray voltage, and may be set to be shorter than a ½ frame period. Because the 3D control voltage Vso applied to the 3D control line G3d is maintained until an initial time of the next frame period has elapsed, the ON time of the third TFTs T3 of the active black stripes included in the pixels whose scan timing is late can be increased. Needless to say, because the 3D control line G3d is connected to all the pixels, the active black stripes AB included in pixels whose scan timing is early are discharged for a long period of time T1 during which the 3D control voltage Vso is supplied to the 3D control line G3d, thereby enabling the active black stripes AB to be discharged down to the black gray voltage.

Taking the current liquid crystal reaction speed, the time t0 required for the active black stripes AB to be discharged down to the black gray voltage is approximately 0.5 msec, which is shorter than a ½ frame period. Accordingly, to of FIG. 5 and t1 of FIG. 8 may be about 0.5 msec. When the driving circuits 102 and 103 are driven with a frame frequency of 240 Hz, which is obtained when an NTSC mode input frame frequency is multiplied four times by the timing controller 101, 1 frame period 1FR and T1 of FIG. 8 is approximately 4.15 msec.

In the following embodiments, the 3D control line G3d of the liquid crystal display panel 100 is divided into two or more parts.

Figure 10:
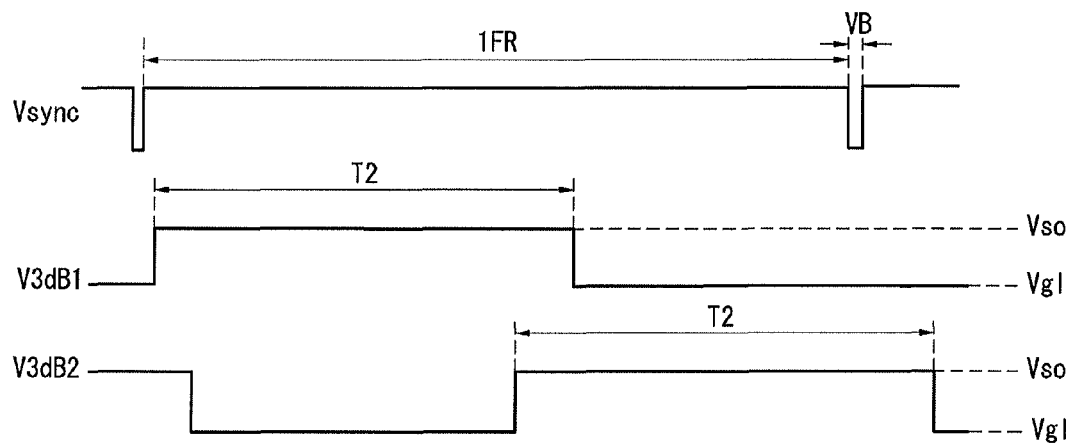
FIG. 10 is a waveform diagram showing a method for driving an active black stripe according to a third exemplary embodiment of the present invention which is applied to the two-division driving shown in FIG. 9.
Figure 11:
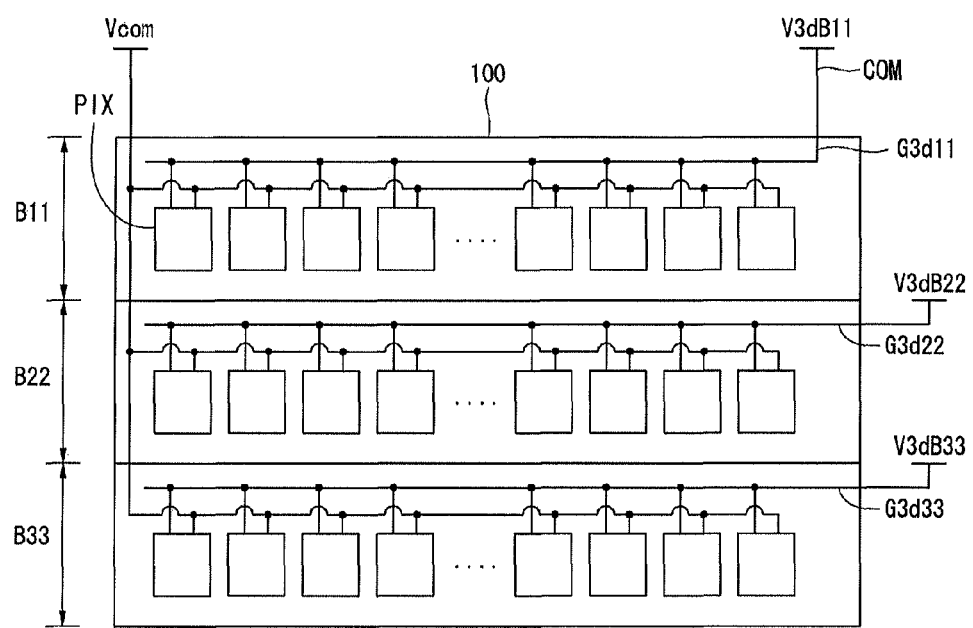
FIG. 11 is a view showing an example of three-division driving of the stereoscopic image display.

FIGS. 9 and 10 are views showing a method for driving an active black stripe according to a third exemplary embodiment of the present invention.

Referring to FIGS. 9 and 10, the liquid crystal display panel 100 may be vertically divided into a first screen block B and a second screen block B2. The first screen block B1 includes pixels present in an upper half part of a pixel array of the liquid crystal display panel 100, and the second screen block B2 includes pixels present in a lower half part of the pixel array of the liquid crystal display panel 100. If gate pulses are sequentially supplied to the first gate line G1 to the n-th gate line Gn, the scan timing of the lower half part of the pixel array is later than that of the upper half part thereof. Although FIG. 9 illustrates two lines of pixels in each of the first and second screen blocks B1 and B2 for convenience of explanation, it is to be noted that each of the first and second screen blocks B1 and B2 may include two or more lines of pixels.

The 3D control line G3d is divided into a first 3D control line G3d1 connected to the pixels in the first screen block B1 and a second 3D control line G3d2 connected to the pixels in the second screen block B2. The other components of the liquid crystal display panel 100, except for the 3D control line G3d1 and G3d2, are not divided into two for the first and second screen blocks B1 and B2, but are substantially identical to those of FIG. 3.

In the 3D mode, an alternating voltage V3dB1 is supplied to the first 3D control line G3d1. The voltage of the first common voltage line G3d1 is maintained at the 3D control voltage Vso during a predetermined time T2 from the start timing of a frame period, and then lowered to the gate low voltage Vgl. The third TFTs T3 of the active black stripes AB present in the first screen block B1 are turned on by the 3D control voltage Vso applied to the first 3D control line G3d1 to thus discharge the voltage of the liquid crystal cells C1c2 and storage capacitors Cst2 of the active black stripes AB down to the black gray voltage during the time T2.

In the 3D mode, an alternating voltage V3dB2 is supplied to the second 3D control line G3d2. The voltage V3dB2 of the second common voltage line G3d2 rises to the 3D control voltage Vso since an approximately ½ frame period, and is maintained at the 3D control voltage Vso during the time T2. The voltage of the second 3D control line G3d2 is maintained at the 3D control voltage Vso within the current frame period in order to ensure sufficient discharge time of the active black stripes AB included in the pixels whose scan timing is late. Moreover, the 3D control voltage is maintained until t0 has elapsed from the start timing of the next frame period, and then lowered to the gate low voltage Vgl. The third TFTs T3 of the active black stripes AB present in the second screen block B2 are turned on by the 3D control voltage Vso applied to the second 3D control line G3d2 to thus discharge the voltage of the liquid crystal cells C1c2 and storage capacitors Cst2 of the active black stripes AB down to the black gray voltage during the time T2.

In the 3D mode, a rear part of the time during which the 3D control voltage Vso is supplied to the first 3D control line G3d1 and a front part of the time during which the 3D control voltage Vso is supplied to the second 3D control line G3d2 may overlap with each other as shown in FIG. 10. In this case, it is possible to ensure a sufficient discharge time of the active black stripes AB included in the first screen block B1, which is longer than the time T2, and it is possible to ensure a sufficient discharge time of the active black stripes AB included in the second screen block B2, which is longer than the time T2.

Figure 12:
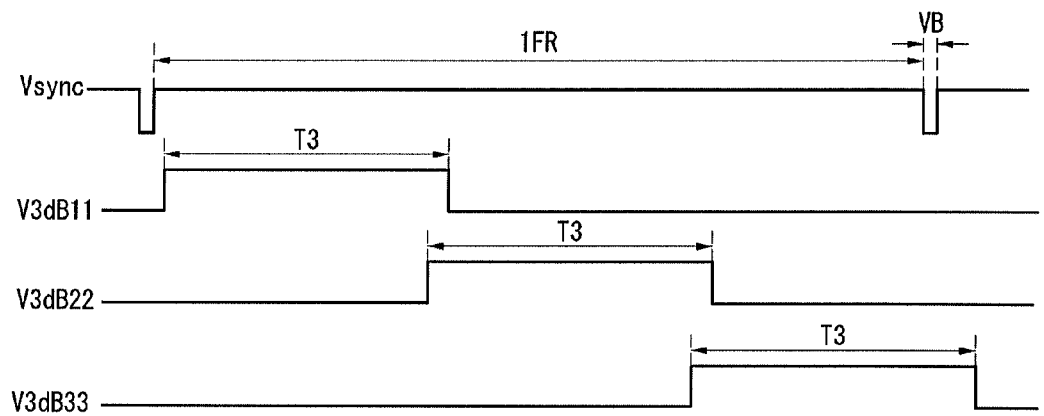
FIG. 12 is a waveform diagram showing a method for driving an active black stripe according to a fourth exemplary embodiment of the present invention which is applied to the three-division driving shown in FIG. 10.
Figure 13:
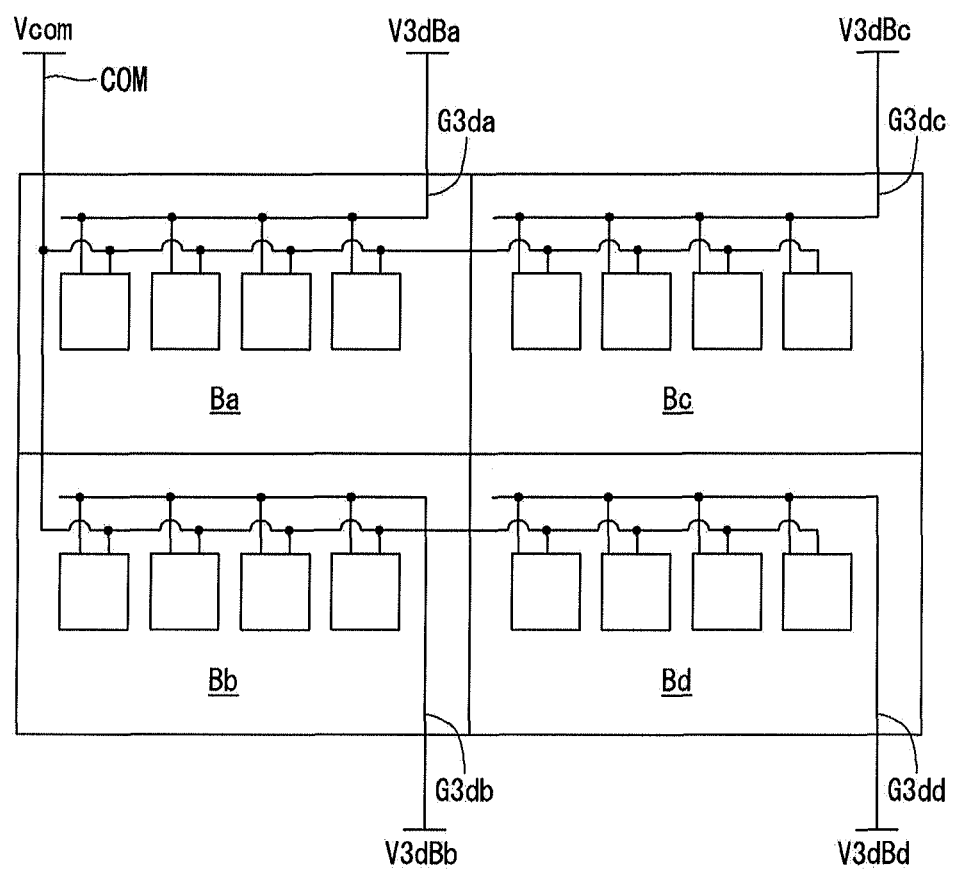
FIG. 13 is a view showing an example of four-division driving of the stereoscopic image display.

FIGS. 11 and 12 are views showing a method for driving an active black stripe according to a fourth exemplary embodiment of the present invention.

Referring to FIGS. 11 and 12, the liquid crystal display panel 100 may be divided into three parts: first to third screen blocks B11 to B33. The first screen block B11 includes pixels present in an upper end part of a pixel array of the liquid crystal display panel 100, and the third screen block B33 includes pixels present in a lower end part of the pixel array of the liquid crystal display panel 100. The second screen block B22 includes pixels present in a middle part of the liquid crystal display panel 100 present between the first screen block B11 and the third screen block B33. If gate pulses are sequentially supplied to the first gate line G1 to the n-th gate line Gn, the pixels of the third screen block B33 are scanned later than the pixels of the first and second screen blocks B11 and B22. Although FIG. 11 illustrates one line of pixels in each of the first to third screen blocks B1 to B3 for convenience of explanation, it is to be noted that each of the first to third screen blocks B1 to B3 may include two or more lines of pixels.

The 3D control line G3d is divided into a first 3D control line G3d11 connected to the pixels in the first screen block B11, a second 3D control line G3d22 connected to the pixels in the second screen block B22, and a third 3D control line G3d33 connected to the pixels in the third screen block B33. The other components of the liquid crystal display paneln100, except for the 3D control line G3d11 to G3d33, are not divided into three for the first to three screen blocks B1 to B3, but are substantially identical to those of FIG. 3.

In the 3D mode, an alternating voltage V3dB11 is supplied to the first 3D control line G3d11. In the 3D mode, the voltage V3dB11 of the first common voltage line G3d11 is maintained at the 3D control voltage Vso during a predetermined time T3 from the start timing of a frame period, and then lowered to the gate low voltage Vgl. The time T3 may be set to be longer than a ½ frame period and shorter than the time T2. The third TFTs T3 of the active black stripes AB present in the first screen block B1 are turned on by the 3D control voltage Vso applied to the first 3D control line G3d11 to thus discharge the voltage of the liquid crystal cells C1c2 and storage capacitors Cst2 of the active black stripes AB down to the black gray voltage during the time T3.

In the 3D mode, an alternating voltage V3dB22 is supplied to the second 3D control line G3d22. The voltage V3dB22 of the second common voltage line G3d22 rises to the 3D control voltage Vso after the voltage of the first 3D control line G3*d*11 rises to the 3D control voltage Vso, and is then maintained at the 3D control voltage Vso during the time T3. The voltage V3*d*B22 of the second 3D control line G3*d*22 may start to rise to the 3D control voltage Vso after a certain time has elapsed from the rising timing at which the voltage V3*d*B11 of the first 3D control line G3*d*11 rises to the 3D control voltage Vso. The third TFTs T3 of the active black stripes AB present in the second screen block B22 may be turned on by the 3D control voltage Vso applied to the second 3D control line G3*d*22 to thus discharge the voltage of the liquid crystal cells C1*c*2 and storage capacitors Cst2 of the active black stripes AB down to the black gray voltage during the time T3.

In the 3D mode, an alternating voltage V3*d*B33 is supplied to the third 3D control line G3*d*33. The voltage V3*d*B33 of the third common voltage line G3*d*33 rises to the 3D control voltage Vso after the voltage of the second 3D control line G3*d*22 rises to the 3D control voltage Vso, and is then maintained at the 3D control voltage Vso during the time T3. The voltage of the third 3D control line G3*d*33 is maintained at the 3D control voltage Vso within the current frame period in order to ensure sufficient discharge time of the active black stripes AB included in the pixels whose scan timing is late. Moreover, the 3D control voltage is maintained until t0 has elapsed from the start timing of the next frame period, and then lowered to the gate low voltage Vgl. The third TFTs T3 of the active black stripes AB present in the third screen block B33 are turned on by the 3D control voltage Vso applied to the third 3D control line G3*d*33 to thus discharge the voltage of the liquid crystal cells C1*c*2 and storage capacitors Cst2 of the active black stripes AB down to the black gray voltage during the time T3.

Figure 14:
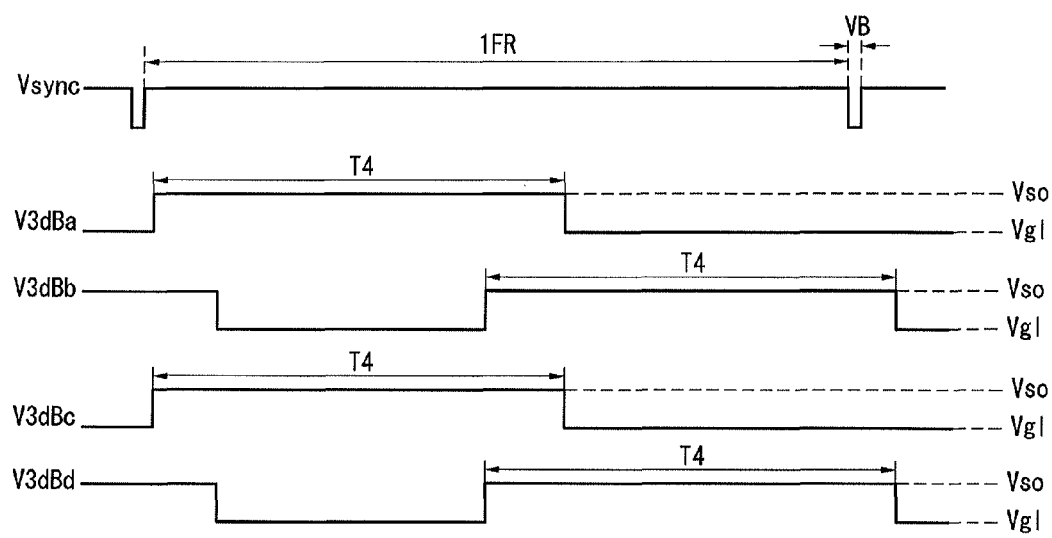
FIG. 14 is a waveform diagram showing a method for driving an active black stripe according to a fifth exemplary embodiment of the present invention which is applied to the four-division driving shown in FIG. 13.

FIGS. 13 and 14 are views showing a method for driving an active black stripe according to a fifth exemplary embodiment of the present invention.

Referring to FIGS. 13 and 14, the liquid crystal display panel 100 may be divided into four parts: first to fourth screen blocks Ba to Bd.

The first screen block Ba includes pixels present at the left half of the upper half part of a pixel array of the liquid crystal display panel 100. The second screen block Bb includes pixels present at the left half of the lower half part of the pixel array of the liquid crystal display panel 100. The third screen block Bc includes pixels present at the right half of the upper half part of the pixel array of the liquid crystal display panel 100. The fourth screen block Bd includes pixels present at the right half of the lower half part of the pixel array of the liquid crystal display panel 100. If gate pulses are sequentially supplied to the first gate line G1 to the n-th gate line Gn, the scan timing of the pixels of the second and fourth screen blocks Bb and Bd is later than that of the pixels of the first and third screen blocks Ba and Bc. Although FIG. 13 illustrates one line of pixels in each of the first to fourth screen blocks Ba to Bd for convenience of explanation, it is to be noted that each of the first to fourth screen blocks Ba to Bd may include two or more lines of pixels.

The 3D control line G3*d* is divided into a first 3D control line G3*da* connected to the pixels in the first screen block Ba, a second 3D control line G3*db* connected to the pixels in the second screen block Bb, a third 3D control line G3*dc* connected to the pixels in the third screen block Bc, and a fourth 3D control line G3*dd* connected to the pixels in the fourth screen block Bd. The other components of the liquid crystal display paneln100, except for the 3D control line G3*da* to G3*dd*, are not divided into four for the first to fourth screen blocks Ba to Bd, but are substantially identical to those of FIG. 3.

In the 3D mode, an alternating voltage V3*d*Ba is supplied to the first 3D control line G3*da*. The voltage V3*d*Ba of the first common voltage line G3*da* is maintained at the 3D control voltage Vso during a predetermined time T4 from the start timing of a frame period, and then lowered to the gate low voltage Vgl. The time T4 may be set to be longer than a ½ frame period and shorter than the time T2. The third TFTs T3 of the active black stripes AB present in the first screen block Ba are turned on by the 3D control voltage Vso applied to the first 3D control line G3*da* to thus discharge the voltage of the liquid crystal cells C1*c*2 and storage capacitors Cst2 of the active black stripes AB down to the black gray voltage during the time T4.

In the 3D mode, an alternating voltage V3*d*Bb is supplied to the second 3D control line G3*db*. The voltage V3*d*Bb of the second common voltage line G3*db* rises to the 3D control voltage Vso after the voltage of the first and third 3D control lines G3*da* and G3*dc* rises to the 3D control voltage Vso, and is then maintained at the 3D control voltage Vso during the time T4. The voltage of the second 3D control line G3*db* is maintained at the 3D control voltage Vso within the current frame period in order to ensure sufficient discharge time of the active black stripes AB included in the pixels whose scan timing is late. Moreover, the 3D control voltage is maintained until t0 has elapsed from the start timing of the next frame period, and then lowered to the gate low voltage Vgl. The third TFTs T3 of the active black stripes AB present in the second screen block Bb are turned on by the 3D control voltage Vso applied to the second 3D control line G3*db* to thus discharge the voltage of the liquid crystal cells Clc2 and storage capacitors Cst2 of the active black stripes AB down to the black gray voltage during the time T4.

In the 3D mode, an alternating voltage V3*d*Bc is supplied to the third 3D control line G3*dc*. In the 3D mode, the voltage V3*d*Bc of the third common voltage line G3*dc* is maintained at the 3D control voltage Vso during the time T4 from the start timing of a frame period, and then lowered to the gate low voltage Vgl. The voltage V3*d*Bc of the third 3D control line G3*dc* and the voltage V3*d*Ba of the first 3D control line G3*da* may simultaneously rise to the 3D control voltage Vso, as shown in FIG. 14. The third TFTs T3 of the active black stripes AB present in the third screen block Bc are turned on by the 3D control voltage Vso applied to the third 3D control line G3*dc* to thus discharge the voltage of the liquid crystal cells C1*c*2 and storage capacitors Cst2 of the active black stripes AB down to the black gray voltage during the time T4.

In the 3D mode, an alternating voltage V3*d*Bd is supplied to the fourth 3D control line G3*dd*. The voltage V3*d*Bd of the fourth common voltage line G3*dd* rises to the 3D control voltage Vso after the voltage of the third 3D control line G3*dc* rises to the 3D control voltage Vso, and is then maintained at the 3D control voltage Vso during the time T4. The voltage V3*d*Bd of the fourth 3D control line G3*dd* and the voltage V3*d*Bb of the second 3D control line G3*db* may simultaneously rise to the 3D control voltage Vso, as shown in FIG. 14. The voltage of the fourth 3D control line G3*dd* is maintained at the 3D control voltage Vso within the current frame period in order to ensure sufficient discharge time of the active black stripes AB included in the pixels whose scan timing is late. Moreover, the 3D control voltage is maintained until t0 has elapsed from the start timing of the next frame period, and then lowered to the gate low voltage Vgl. The third TFTs T3 of the active black stripes AB present in the fourth screen block Bd are turned on by the 3D control voltage Vso applied to the fourth 3D control line G3*dd* to thus discharge the voltage of the liquid crystal cells Clc2 and storage capacitors Cst2 of the active black stripes AB down to the black gray voltage during the time T4.

As described above, the present invention can enlarge vertical viewing angle, increase the luminance of a 2D image, and increase aperture ratio by realizing active black stripes in a liquid crystal display panel, the active black stripes displaying image data in the 2D mode and a black gray scale in the 3D mode.

In the present invention, a voltage for discharging the active black stripes of the liquid crystal display panel is periodically lowered to compensate for a gate bias stress of the TFTs formed on the active black stripes, thereby preventing degradation in the driving characteristics of the TFTs. Also, the supply time of a 3D control voltage for discharging the active black stripes can be long enough, so that the active black stripers on the entire screen can be discharged down to the black gray voltage.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A stereoscopic image display comprising:
a liquid crystal display panel including data lines, gate lines crossing the data lines, a common electrode to which a common voltage is applied, a 3D control line to which a 3D control voltage is applied, and a plurality of pixels, each of the pixels being divided into a main pixel portion and an active black stripe;
a data driving circuit that supplies a data voltage of a 2D image to the data lines in 2D mode, and supplies a data voltage of a 3D image to the data lines in 3D mode;
a gate driving circuit that sequentially supplies gate pulses swinging between a gate low voltage and a gate high voltage to the gate lines in the 2D mode and the 3D mode; and
a 3D control voltage generation circuit that supplies the 3D control voltage to the 3D control line and discharges a voltage of the active black stripe down to a black gray voltage,
wherein the 3D control voltage generation circuit supplies an alternating voltage swinging between the 3D control voltage and the gate low voltage to the 3D control line in the 3D mode, and supplies the gate low voltage to the 3D control line in the 2D mode,
wherein the 3D control voltage is higher than the common voltage and lower than the gate high voltage,
wherein a voltage of the 3D control line is lowered to the gate low voltage during a vertical blank period between an N-th (where N is a natural number) frame period and an (N+1)-th frame period.

2. The stereoscopic image display of claim 1, wherein the main pixel portion comprises a first TFT that supplies a data voltage from a specific data line to a fist liquid crystal cell and a first storage capacitor in response to a gate pulse from a specific gate line,
the active black stripe comprises:
a second TFT that supplies a data voltage from a specific data line to a second liquid crystal cell and a second storage capacitor in response to a gate pulse from a specific gate line; and
a third TFT that discharges a voltage of the first liquid crystal cell and the first storage capacitor down to the common voltage in response to the 3D control voltage from the 3D control line.

3. A stereoscopic image display comprising:
a liquid crystal display panel including data lines, gate lines crossing the data lines, a common electrode to which a common voltage is applied, a 3D control line to which a 3D control voltage is applied, and a plurality of pixels, each of the pixels being divided into a main pixel portion and an active black stripe;
a data driving circuit that supplies a data voltage of a 2D image to the data lines in 2D mode, and supplies a data voltage of a 3D image to the data lines in 3D mode;
a gate driving circuit that sequentially supplies gate pulses swinging between a gate low voltage and a gate high voltage to the gate lines in the 2D mode and the 3D mode; and
a 3D control voltage generation circuit that supplies the 3D control voltage to the 3D control line and discharges a voltage of the active black stripe down to a black gray voltage,
wherein the 3D control voltage generation circuit supplies an alternating voltage swinging between the 3D control voltage and the gate low voltage to the 3D control line in the 3D mode, and supplies the gate low voltage to the 3D control line in the 2D mode,
wherein the 3D control voltage is higher than the common voltage and lower than the gate high voltage,
wherein a voltage of the 3D control line is maintained at the 3D control voltage until a predetermined time of an (N+1)-th frame period has elapsed since an N-th (where N is a natural number) frame period.

4. The stereoscopic image display of claim 3, wherein the predetermined time is longer than about 0.5 msec and shorter than a ½ frame period.

5. The stereoscopic image display of claim 4, wherein the main pixel portion comprises a first TFT that supplies a data voltage from a specific data line to a fist liquid crystal cell and a first storage capacitor in response to a gate pulse from a specific gate line,
the active black stripe comprises:
a second TFT that supplies a data voltage from a specific data line to a second liquid crystal cell and a second storage capacitor in response to a gate pulse from a specific gate line; and
a third TFT that discharges a voltage of the first liquid crystal cell and the first storage capacitor down to the common voltage in response to the 3D control voltage from the 3D control line.

6. A stereoscopic image display comprising:
a liquid crystal display panel including data lines, gate lines crossing the data lines, a common electrode to which a common voltage is applied, a plurality of divided 3D control lines to which a 3D control voltage is applied, and a plurality of pixels, each of the pixels being divided into a main pixel portion and an active black stripe;
a data driving circuit that supplies a data voltage of a 2D image to the data lines in 2D mode, and supplies a data voltage of a 3D image to the data lines in 3D mode;

a gate driving circuit that sequentially supplies gate pulses swinging between a gate low voltage and a gate high voltage to the gate lines in the 2D mode and the 3D mode; and a 3D control voltage generation circuit that supplies an alternating voltage swinging between the 3D control voltage and the gate low voltage to the divided 3D control lines at time intervals in the 3D mode, and supplies the gate low voltage to the 3D control line in the 2D mode, wherein the 3D control voltage which is supplied to the divided 3D control lines to discharge a voltage of the active black stripe down to a black gray voltage is higher than the common voltage and lower than the gate high voltage, and wherein a voltage of one or more of the divided 3D control lines is maintained until a predetermined time of an (N+1)-th frame period has elapsed since an N-th (where N is a natural number) frame period.

7. The stereoscopic image display of claim 6, wherein the predetermined time is longer than about 0.5 msec and shorter than a ½ frame period.

8. The stereoscopic image display of claim 6, wherein the 3D control lines comprise:
   a first 3D control line connected to the active black stripes of the pixels formed in an upper half part of the liquid crystal display panel; and
   a second 3D control line connected to the active black stripes of the pixels formed in a lower half part of the liquid crystal display panel,
   wherein the scan timing of the lower half part of the liquid crystal display panel is later than that of the upper half part of the liquid crystal display panel,
   the 3D control voltage starts to be supplied to the second 3D control line after the 3D control voltage starts to be supplied to the first 3D control line, and
   a voltage of the second 3D control line is maintained at the 3D control voltage until a predetermined time of the (N+1)-th frame period has elapsed since the N-th (where N is a natural number) frame period.

9. The stereoscopic image display of claim 6, wherein the 3D control lines comprise:
   a first 3D control line connected to the active black stripes of the pixels formed in an upper half part of the liquid crystal display panel;
   a second 3D control line connected to the active black stripes of the pixels formed in a middle part of the liquid crystal display panel; and
   a third 3D control line connected to the active black stripes of the pixels formed in a lower half part of the liquid crystal display panel,
   wherein the scan timing of the lower half part of the liquid crystal display panel is later than that of the upper half part of the liquid crystal display panel,
   the 3D control voltage starts to be supplied to the second 3D control line after the 3D control voltage starts to be supplied to the first 3D control line,
   the 3D control voltage starts to be supplied to the third 3D control line after the 3D control voltage starts to be supplied to the second 3D control line, and
   a voltage of the third 3D control line is maintained at the 3D control voltage until a predetermined time of the (N+1)-th frame period has elapsed since the N-th (where N is a natural number) frame period.

10. The stereoscopic image display of claim 6, wherein the 3D control lines comprise:
    a first 3D control line connected to the active black stripes of the pixels formed in an upper left part of the liquid crystal display panel;
    a second 3D control line connected to the active black stripes of the pixels formed in a lower left part of the liquid crystal display panel;
    a third 3D control line connected to the active black stripes of the pixels formed in an upper right part of the liquid crystal display panel; and
    a fourth 3D control line connected to the active black stripes of the pixels formed in a lower right part of the liquid crystal display panel,
    wherein the scan timing of the lower left part and lower right part of the liquid crystal display panel is later than that of the upper left part and upper right part of the liquid crystal display panel,
    the 3D control voltage starts to be supplied to the second and fourth 3D control lines after the 3D control voltage starts to be supplied to the first and third 3D control lines,
    a voltage of the second and fourth 3D control lines is maintained at the 3D control voltage until a predetermined time of the (N+1)-th frame period has elapsed since the N-th (where N is a natural number) frame period.

11. The stereoscopic image display of claim 6, wherein the main pixel portion comprises a first TFT that supplies a data voltage from a data line to a fist liquid crystal cell and a first storage capacitor in response to a gate pulse from a gate line, the active black stripe comprises:
    a second TFT that supplies a data voltage from the data line to a second liquid crystal cell and a second storage capacitor in response to a gate pulse from the gate line; and
    a third TFT that discharges a voltage of the first liquid crystal cell and the first storage capacitor down to the common voltage in response to the 3D control voltage from any one of the 3D control lines.

* * * * *